United States Patent
Yoshida

(10) Patent No.: US 9,767,399 B2
(45) Date of Patent: Sep. 19, 2017

(54) MANAGEMENT APPARATUS WHICH CONTROLS LIMIT VALUE OF STORAGE VOLUME OF SETTING DATA ACCORDING TO TYPE OF SETTING DATA, CONTROL METHOD FOR CONTROLLING MANAGEMENT APPARATUS, STORAGE MEDIUM STORING PROGRAM, AND SYSTEM

(71) Applicant: CANON KABUSHIKI KAISHA, Tokyo (JP)

(72) Inventor: Toru Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/180,408

(22) Filed: Jun. 13, 2016

(65) Prior Publication Data

US 2017/0004392 A1    Jan. 5, 2017

(30) Foreign Application Priority Data

Jun. 30, 2015 (JP) ................................. 2015-131843

(51) Int. Cl.
| | |
|---|---|
| *G06F 15/00* | (2006.01) |
| *G06F 3/12* | (2006.01) |
| *G06K 1/00* | (2006.01) |
| *G06K 15/00* | (2006.01) |
| *H04N 1/00* | (2006.01) |

(52) U.S. Cl.
CPC ....... *G06K 15/402* (2013.01); *H04N 1/00244* (2013.01); *H04N 1/00344* (2013.01); *H04N 2201/0094* (2013.01)

(58) Field of Classification Search
CPC .. G06K 15/02; G06K 15/402; H04N 1/00244; H04N 1/00344; H04N 2201/0094
USPC .............................. 358/1.13, 1.15, 1.1, 1.14
See application file for complete search history.

(56) References Cited

U.S. PATENT DOCUMENTS

| | | | |
|---|---|---|---|
| 7,042,596 B1 | 5/2006 | Yoshida | |
| 2008/0137441 A1* | 6/2008 | Morikawa | H04N 1/00347 365/189.05 |
| 2010/0241257 A1* | 9/2010 | Takahashi | H04S 1/007 700/94 |
| 2016/0203200 A1* | 7/2016 | Okayama | G06F 17/30371 707/620 |

FOREIGN PATENT DOCUMENTS

JP      2001-326796 A    11/2001

* cited by examiner

*Primary Examiner* — Douglas Tran
(74) *Attorney, Agent, or Firm* — Fitzpatrick, Cella, Harper & Scinto

(57) ABSTRACT

A management apparatus includes a storage unit configured to store setting data for use in a device to be managed. For each type of the setting data, a limit value for the volume of the data to be stored in the storage unit is controlled based on management information.

13 Claims, 20 Drawing Sheets

FIG. 4

| TYPE OF SETTING DATA | CURRENT DATA VOLUME | UPPER LIMIT | LOWER LIMIT | SHARED/INDIVIDUAL |
|---|---|---|---|---|
| PERSONALIZED DATA | | | | |
| DEVICE BASIC DATA | | | | |
| DEVICE SPECIFICATION DATA | | | | |
| DEVICE SETTING DATA | | | | |
| ONE-TOUCH ADDRESS BOOK | | | | |
| GENERAL ADDRESS BOOK | | | | |
| ADMINISTRATOR ADDRESS BOOK | | | | |
| USER INFORMATION DATA | | | | |

FIG. 5

| TYPE OF SETTING DATA | MINIMUM VALUE | MAXIMUM VALUE |
|---|---|---|
| PERSONALIZED DATA | 0.5 MB | 10 MB |
| DEVICE BASIC DATA | 1 MB | – |
| DEVICE SPECIFICATION DATA | 10 MB | – |
| DEVICE SETTING DATA | 2 MB | 5 MB |
| ONE-TOUCH ADDRESS BOOK | 10 MB | 20 MB |
| GENERAL ADDRESS BOOK | 80 MB | 160 MB |
| ADMINISTRATOR ADDRESS BOOK | 10 MB | 20 MB |
| USER INFORMATION DATA | 0 MB | 10 MB |
| | | |

F I G. 6

| TYPE OF SETTING DATA | CURRENT DATA VOLUME | UPPER LIMIT | LOWER LIMIT | SHARED/INDIVIDUAL |
|---|---|---|---|---|
| PERSONALIZED DATA | 0 MB | 1708 MB | — | — |
| DEVICE BASIC DATA | 0 MB | — | 10 MB | — |
| DEVICE SPECIFICATION DATA | 0 MB | — | 100 MB | — |
| DEVICE SETTING DATA | 0 MB | — | 20 MB | — |
| ONE-TOUCH ADDRESS BOOK | 0 MB | — | 20 MB | SHARED |
| GENERAL ADDRESS BOOK | 0 MB | — | 160 MB | SHARED |
| ADMINISTRATOR ADDRESS BOOK | 0 MB | — | 20 MB | SHARED |
| USER INFORMATION DATA | 0 MB | — | 10 MB | SHARED |

F I G. 8

| TYPE OF SETTING DATA | CURRENT DATA VOLUME | UPPER LIMIT | LOWER LIMIT | SHARED/INDIVIDUAL |
|---|---|---|---|---|
| PERSONALIZED DATA | 0 MB | 1702 MB | — | — |
| DEVICE BASIC DATA | 2 MB | — | 10 MB | — |
| DEVICE SPECIFICATION DATA | 20 MB | — | 100 MB | — |
| DEVICE SETTING DATA | 4 MB | — | 26 MB | — |
| ONE-TOUCH ADDRESS BOOK | 0 MB | — | 20 MB | SHARED |
| GENERAL ADDRESS BOOK | 0 MB | — | 160 MB | SHARED |
| ADMINISTRATOR ADDRESS BOOK | 0 MB | — | 20 MB | SHARED |
| USER INFORMATION DATA | 1 MB | — | 10 MB | SHARED |

F I G. 10

| TYPE OF SETTING DATA | CURRENT DATA VOLUME | UPPER LIMIT | LOWER LIMIT | SHARED/INDIVIDUAL |
|---|---|---|---|---|
| PERSONALIZED DATA | 50 MB | 1702 MB | 50 MB | - |
| DEVICE BASIC DATA | 2 MB | - | 10 MB | - |
| DEVICE SPECIFICATION DATA | 20 MB | - | 100 MB | - |
| DEVICE SETTING DATA | 5 MB | - | 26 MB | - |
| ONE-TOUCH ADDRESS BOOK | 15 MB | - | 20 MB | SHARED |
| GENERAL ADDRESS BOOK | 20 MB | - | 160 MB | SHARED |
| ADMINISTRATOR ADDRESS BOOK | 2 MB | - | 20 MB | SHARED |
| USER INFORMATION DATA | 1 MB | - | 10 MB | SHARED |

F I G. 11

| TYPE OF SETTING DATA | CURRENT DATA VOLUME | UPPER LIMIT | LOWER LIMIT | SHARED/INDIVIDUAL |
|---|---|---|---|---|
| PERSONALIZED DATA | 50 MB | 1602 MB | 50 MB | - |
| DEVICE BASIC DATA | 2 MB | - | 10 MB | - |
| DEVICE SPECIFICATION DATA | 20 MB | - | 100 MB | - |
| DEVICE SETTING DATA | 5 MB | - | 26 MB | - |
| ONE-TOUCH ADDRESS BOOK | 30 MB | - | 120 MB | INDIVIDUAL |
| GENERAL ADDRESS BOOK | 20 MB | - | 160 MB | SHARED |
| ADMINISTRATOR ADDRESS BOOK | 2 MB | - | 20 MB | SHARED |
| USER INFORMATION DATA | 1 MB | | 10 MB | SHARED |

FIG. 12

| TYPE OF SETTING DATA | CURRENT DATA VOLUME | UPPER LIMIT | LOWER LIMIT | SHARED/INDIVIDUAL |
|---|---|---|---|---|
| PERSONALIZED DATA | 50 MB | 1589 MB | 50 MB | — |
| DEVICE BASIC DATA | 2 MB | — | 10 MB | — |
| DEVICE SPECIFICATION DATA | 20 MB | — | 100 MB | — |
| DEVICE SETTING DATA | 5 MB | — | 29 MB | — |
| ONE-TOUCH ADDRESS BOOK | 30 MB | — | 130 MB | INDIVIDUAL |
| GENERAL ADDRESS BOOK | 20 MB | — | 160 MB | SHARED |
| ADMINISTRATOR ADDRESS BOOK | 2 MB | — | 20 MB | SHARED |
| USER INFORMATION DATA | 1 MB | — | 10 MB | SHARED |

F I G. 13

| TYPE OF SETTING DATA | CURRENT DATA VOLUME | UPPER LIMIT | LOWER LIMIT | SHARED/INDIVIDUAL |
|---|---|---|---|---|
| PERSONALIZED DATA | 750 MB | 709 MB | 750 MB | — |
| DEVICE BASIC DATA | 5 MB | — | 10 MB | — |
| DEVICE SPECIFICATION DATA | 50 MB | — | 100 MB | — |
| DEVICE SETTING DATA | 15 MB | — | 29 MB | — |
| ONE-TOUCH ADDRESS BOOK | 30 MB | — | 130 MB | INDIVIDUAL |
| GENERAL ADDRESS BOOK | 45 MB | — | 1040 MB | INDIVIDUAL |
| ADMINISTRATOR ADDRESS BOOK | 15 MB | — | 20 MB | SHARED |
| USER INFORMATION DATA | 3 MB | — | 10 MB | SHARED |

F I G. 14

| TYPE OF SETTING DATA | CURRENT DATA VOLUME | UPPER LIMIT | LOWER LIMIT | SHARED/INDIVIDUAL |
|---|---|---|---|---|
| PERSONALIZED DATA | 750 MB | 1479 MB | 750 MB | — |
| DEVICE BASIC DATA | 5 MB | — | 10 MB | — |
| DEVICE SPECIFICATION DATA | 50 MB | — | 100 MB | — |
| DEVICE SETTING DATA | 15 MB | — | 29 MB | — |
| ONE-TOUCH ADDRESS BOOK | 50 MB | — | 130 MB | INDIVIDUAL |
| GENERAL ADDRESS BOOK | 15 MB | — | 160 MB | SHARED |
| ADMINISTRATOR ADDRESS BOOK | 45 MB | — | 130 MB | INDIVIDUAL |
| USER INFORMATION DATA | 3 MB | — | 10 MB | SHARED |

FIG. 16

| TYPE OF SETTING DATA | CURRENT DATA VOLUME | UPPER LIMIT | LOWER LIMIT | SHARED/INDIVIDUAL |
|---|---|---|---|---|
| PERSONALIZED DATA | 0 MB | 1702 MB | 100 MB | — |
| DEVICE BASIC DATA | 2 MB | — | 10 MB | — |
| DEVICE SPECIFICATION DATA | 20 MB | — | 100 MB | — |
| DEVICE SETTING DATA | 4 MB | — | 26 MB | — |
| ONE-TOUCH ADDRESS BOOK | 0 MB | — | 20 MB | SHARED |
| GENERAL ADDRESS BOOK | 0 MB | — | 160 MB | SHARED |
| ADMINISTRATOR ADDRESS BOOK | 0 MB | — | 20 MB | SHARED |
| USER INFORMATION DATA | 1 MB | — | 10 MB | SHARED |

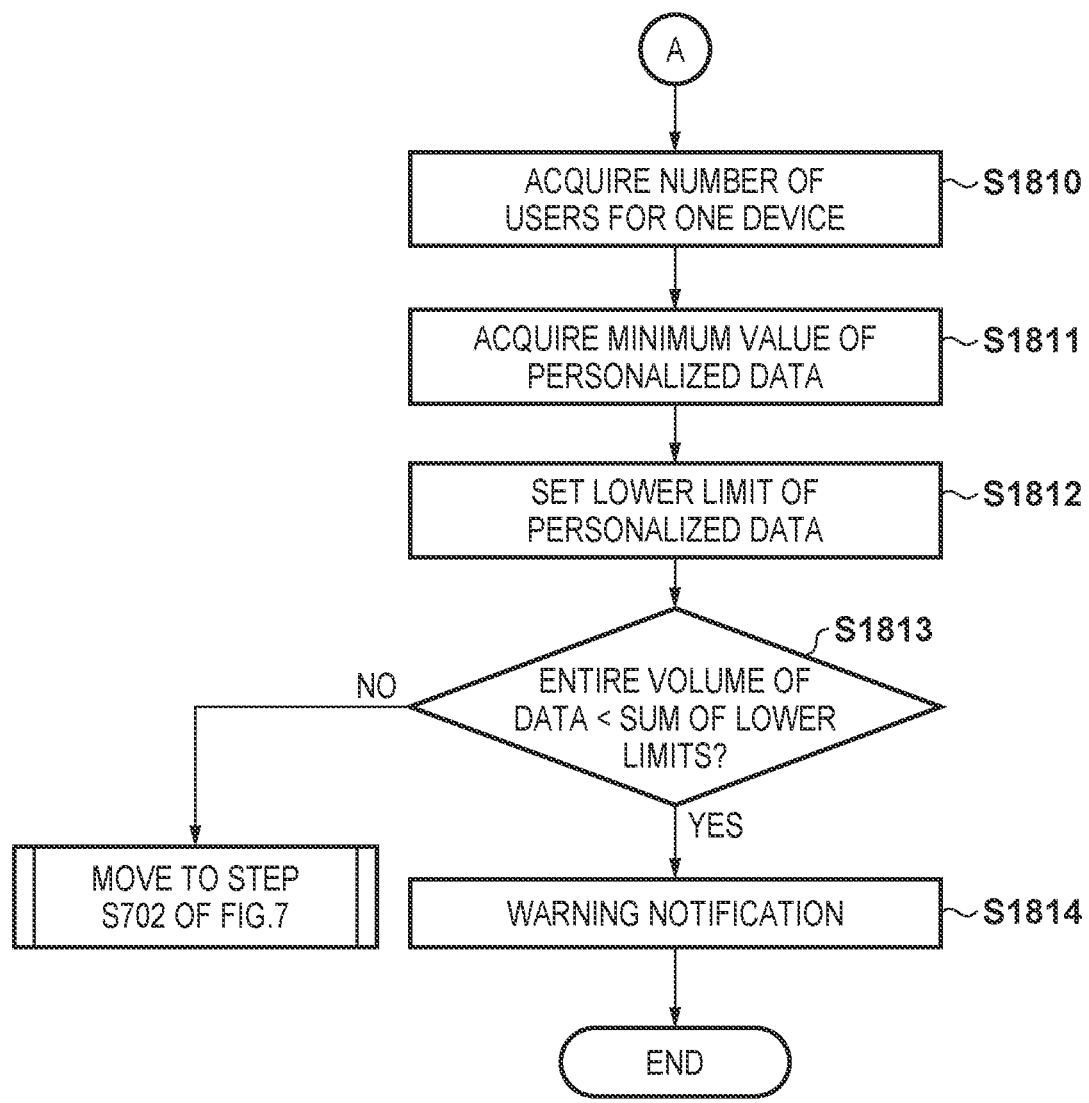

F I G. 19

| TYPE OF SETTING DATA | CURRENT DATA VOLUME | UPPER LIMIT | LOWER LIMIT | SHARED/INDIVIDUAL |
|---|---|---|---|---|
| PERSONALIZED DATA | 0 MB | 709 MB | 150 MB | — |
| DEVICE BASIC DATA | 0 MB | — | 10 MB | — |
| DEVICE SPECIFICATION DATA | 0 MB | — | 100 MB | — |
| DEVICE SETTING DATA | 0 MB | — | 29 MB | — |
| ONE-TOUCH ADDRESS BOOK | 0 MB | — | 130 MB | INDIVIDUAL |
| GENERAL ADDRESS BOOK | 0 MB | — | 1040 MB | INDIVIDUAL |
| ADMINISTRATOR ADDRESS BOOK | | — | 20 MB | SHARED |
| USER INFORMATION DATA | | — | 10 MB | SHARED |

MANAGEMENT APPARATUS WHICH CONTROLS LIMIT VALUE OF STORAGE VOLUME OF SETTING DATA ACCORDING TO TYPE OF SETTING DATA, CONTROL METHOD FOR CONTROLLING MANAGEMENT APPARATUS, STORAGE MEDIUM STORING PROGRAM, AND SYSTEM

BACKGROUND OF THE INVENTION

Field of the Invention

The present invention relates to a management apparatus for managing a device, a control method, a storage medium storing a program, and a system.

Description of the Related Art

In the management of data, an upper limit for each type of data at which management is possible is held as a fixed value, and management is performed until the number of pieces of data reaches a predetermined value or the volume of data reaches a predetermined volume. Particularly, when it is not possible to increase the volume of data that can be stored and the upper limit of the volume of data is fixed, management is performed with an upper limit for each type of data that is set as a fixed value so that the entire data volume falls within an upper limit. Japanese Patent Laid-Open No. 2001-326796 discloses that since management with an upper limit for each type of data that is set as a fixed value cannot flexibly deal with the usage status of a user, management is performed with an upper limit set for a plurality of pieces of setting data together, improving the flexibility.

However, according to Japanese Patent Laid-Open No. 2001-326796, there may be a case where when pieces of setting data are associated with each other, such as when registering one piece of setting data involves registering another piece of setting data, registration of the setting data is impossible. In this case, inconsistency may occur between the pieces of setting data.

SUMMARY OF THE INVENTION

An aspect of the present invention is to eliminate the above-mentioned problems with the conventional technology. The present invention provides a management apparatus, a control method, a storage medium storing a program, and a system that flexibly control limit values of the data volume of setting data and improve reliability of data management.

The present invention in one aspect provides a management apparatus for managing a device, comprising: a storage unit configured to store setting data for use in the device to be managed; an acquisition unit configured to acquire management information relating to the setting data, the management information being associated with each type of the setting data; and a control unit configured to control, for each type of the setting data, a limit value for a volume of the data to be stored in the storage unit based on the management information acquired by the acquisition unit.

According to the present invention, it is possible to flexibly control limit values of the data volume of setting data, and improve the reliability of data management.

Further features of the present invention will become apparent from the following description of exemplary embodiments with reference to the attached drawings.

BRIEF DESCRIPTION OF THE DRAWINGS

FIG. 4 is a diagram illustrating a management table for managing the data volume of setting data.

FIG. 5 is a diagram illustrating required data sizes of the setting data.

FIG. 6 is a diagram illustrating a management table for managing the data volume of the setting data.

FIG. 8 is a diagram illustrating a management table for managing the data volume of the setting data.

FIG. 10 is a diagram illustrating a management table for managing the data volume of the setting data.

FIG. 11 is a diagram illustrating a management table for managing the data volume of the setting data.

FIG. 12 is a diagram illustrating a management table for managing the data volume of the setting data.

FIG. 13 is a diagram illustrating a management table for managing the data volume of the setting data.

FIG. 14 is a diagram illustrating a management table for managing the data volume of the setting data.

FIG. 16 is a diagram illustrating a management table for managing the data volume of the setting data.

FIGS. 18A and 18B are flowcharts of processing for checking whether or not the setting data can be managed.

FIG. 19 is a diagram illustrating a management table for managing the data volume of the setting data.

DESCRIPTION OF THE EMBODIMENTS

Figure 1:
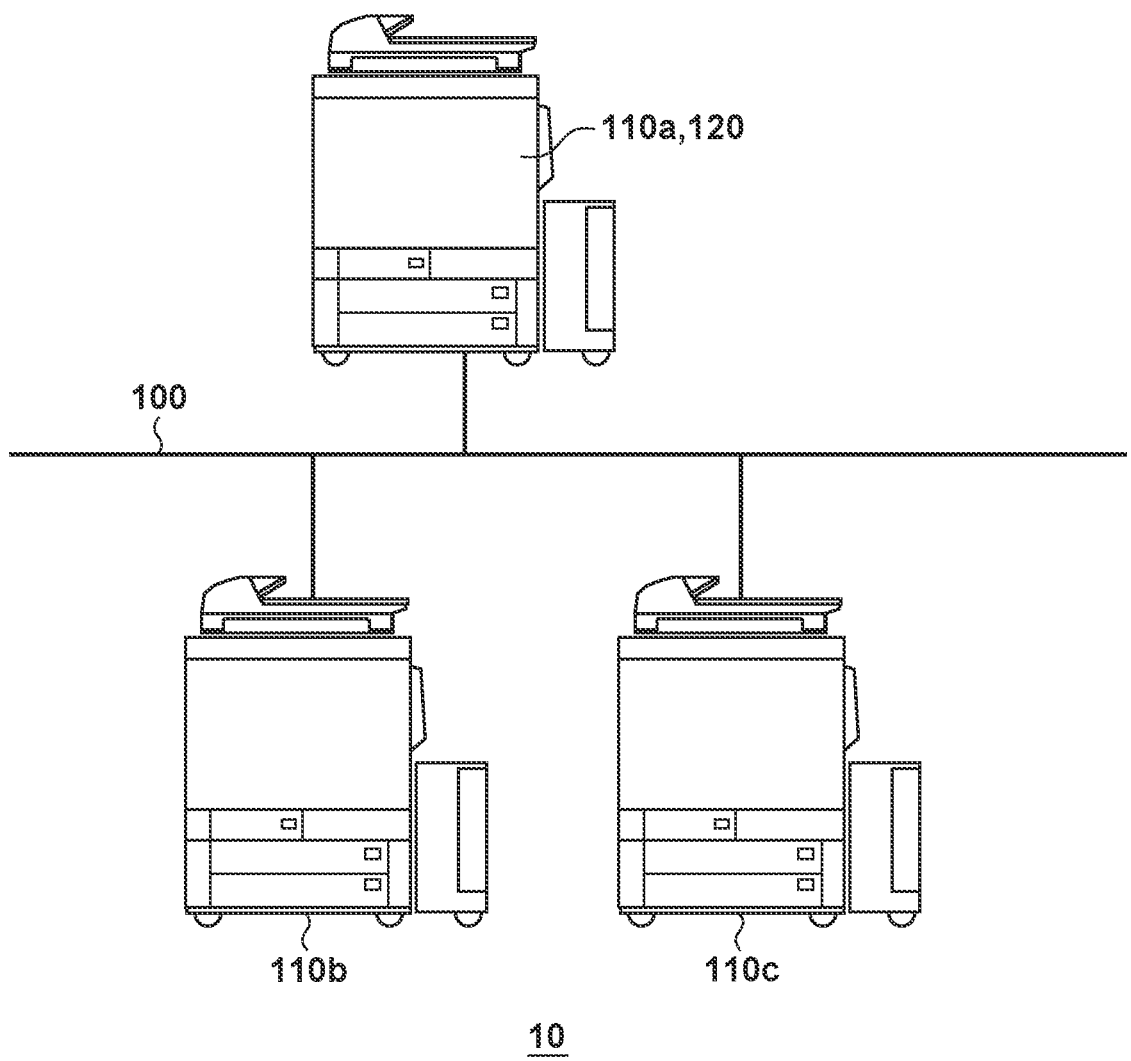
FIG. 1 is a diagram illustrating a configuration of a system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals are given to the same constituent components, and descriptions thereof are omitted.

First Embodiment

FIG. 1 is a diagram illustrating a configuration of a system. In a system 10, digital multifunction peripherals 110a, 110b, and 110c, which are information processing devices, are connected to a network 100, and are communicably connected to each other. In FIG. 1, three digital multifunction peripherals are connected to each other as an example, but the number of connected devices does not have to be 3. In the following, the digital multifunction peripherals 110a, 110b, and 110c may collectively be referred to simply as a digital multifunction peripheral 110. The digital multifunction peripherals are so-called MFPs (multifunctional peripherals) in which a plurality of functions such as a printing function, a copy function, and a facsimile function are incorporated. The network 100 may be a wired network or a wireless network.

A server 120 for executing a server function is installed in the digital multifunction peripheral 110a. The server 120 is capable of communicating with the digital multifunction peripherals 110 via the network 100. The server 120 stores and manages various types of setting data of the digital multifunction peripherals 110. The setting data will be described later.

When the setting data is changed by a user operation, execution of copy/facsimile, or the like, the digital multifunction peripheral 110 transmits the content of the change to the server 120 and requests the server 120 to update the data. Furthermore, the digital multifunction peripheral 110 makes an inquiry regularly or as needed to the server 120 as to whether or not the data that is managed by the server 120 has been updated, and if there is updated data, the digital multifunction peripheral 110 acquires and stores the updated data.

For example, if the data that is managed by the server 120, such as address data of facsimile numbers in an address book for example, is shared by the digital multifunction peripherals 110a and 110b, communication processing of the address data will be performed as follows. If the address data has been changed in the digital multifunction peripheral 110a, the server 120 is notified of the changed address data, and the address data that is managed by the server 120 is updated. Then, when an inquiry from the digital multifunction peripheral 110b makes an inquiry to the server 120 as to whether or not the data has been updated, the server 120 transmits the updated address data as the updated data to the digital multifunction peripheral 110b. Upon receiving the updated address data, the digital multifunction peripheral 110b updates address data already stored in the digital multifunction peripheral 110b, based on the updated address data.

Although in the description above, the server function is executed on the digital multifunction peripheral 110a, the server function may operate on another device such as another digital multifunction peripheral or a PC. Furthermore, in the present embodiment, predetermined types of setting data are described as data to be managed, but the types of setting data are not particularly limited.

Figure 2:
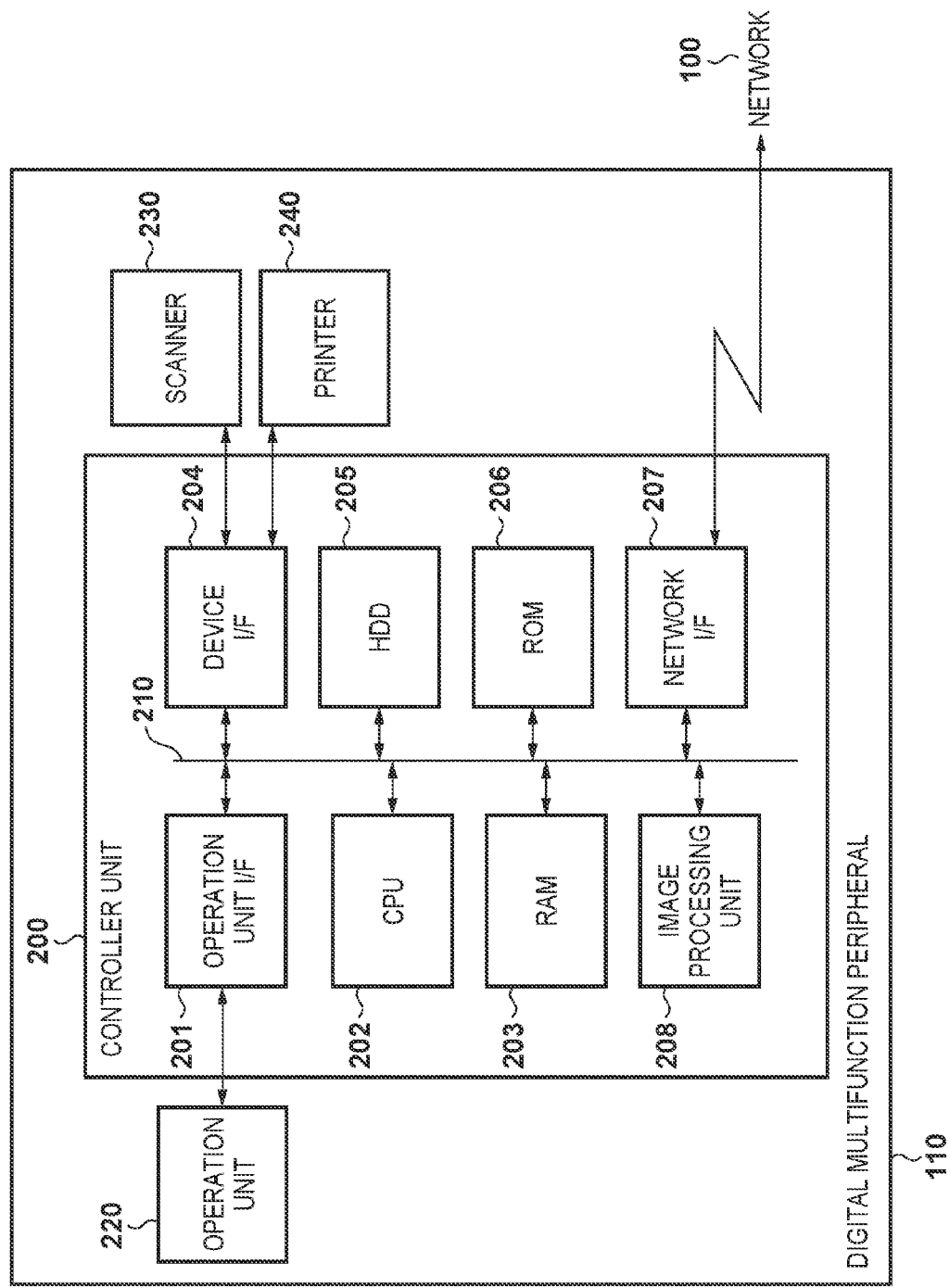
FIG. 2 is a diagram illustrating a block configuration of a digital multifunction peripheral.

FIG. 2 is a diagram illustrating a block configuration of the digital multifunction peripheral 110. The digital multifunction peripheral 110 includes a controller unit 200, an operation unit 220, a scanner 230, and a printer 240. The operation unit 220 is connected to the controller unit 200, and the scanner 230, which is an image input device, and the printer 240, which is an image output device, are also connected the controller unit 200.

The controller unit 200 includes a central processing unit (CPU) 202 for performing overall control of the entire device. The CPU 202 boots up an operating system (OS) using a boot program stored in a read only memory (ROM) 206. The controller unit 200 executes, on this OS, application programs stored in a hard disk drive (HDD) 205 so as to execute various types of processing. A random access memory (RAM) 203 is used as a work area for the CPU 202. The HDD 205 stores the application programs and various types of data. The operation of the present embodiment is realized by, for example, the CPU 202 reading the programs stored in the ROM 206 and the HDD 205 onto the RAM 203 and executing them.

For example, the ROM 206, the RAM 203, an operation unit interface (I/F) 201, a device I/F 204, a network I/F 207, an image processing unit 208 are connected to the CPU 202 via a system bus 210.

The operation unit I/F 201 is an interface with the operation unit 220 provided with a display unit such as a touch panel. The operation unit I/F 201 transmits information such as various types of setting data to be displayed on the operation unit 220 to the operation unit 220, receives information input by a user operation from the operation unit 220, and transmits the received information to the CPU 202. For example, the scanner 230 and the printer 240 are connected to the device I/F 204, and data and control signals are input and output via the device I/F 204. The network I/F 207 is connected to the external network 100, and performs communication with devices on the network 100 via the network 100. The image processing unit 208 executes various types of processing on image data obtained by the scanner 230 optically reading an original, and executes various types of processing such as image rotation, image compression, resolution conversion, color space conversion, and tone conversion on image data, in order for the image data to be printed by the printer 240.

Figure 3:
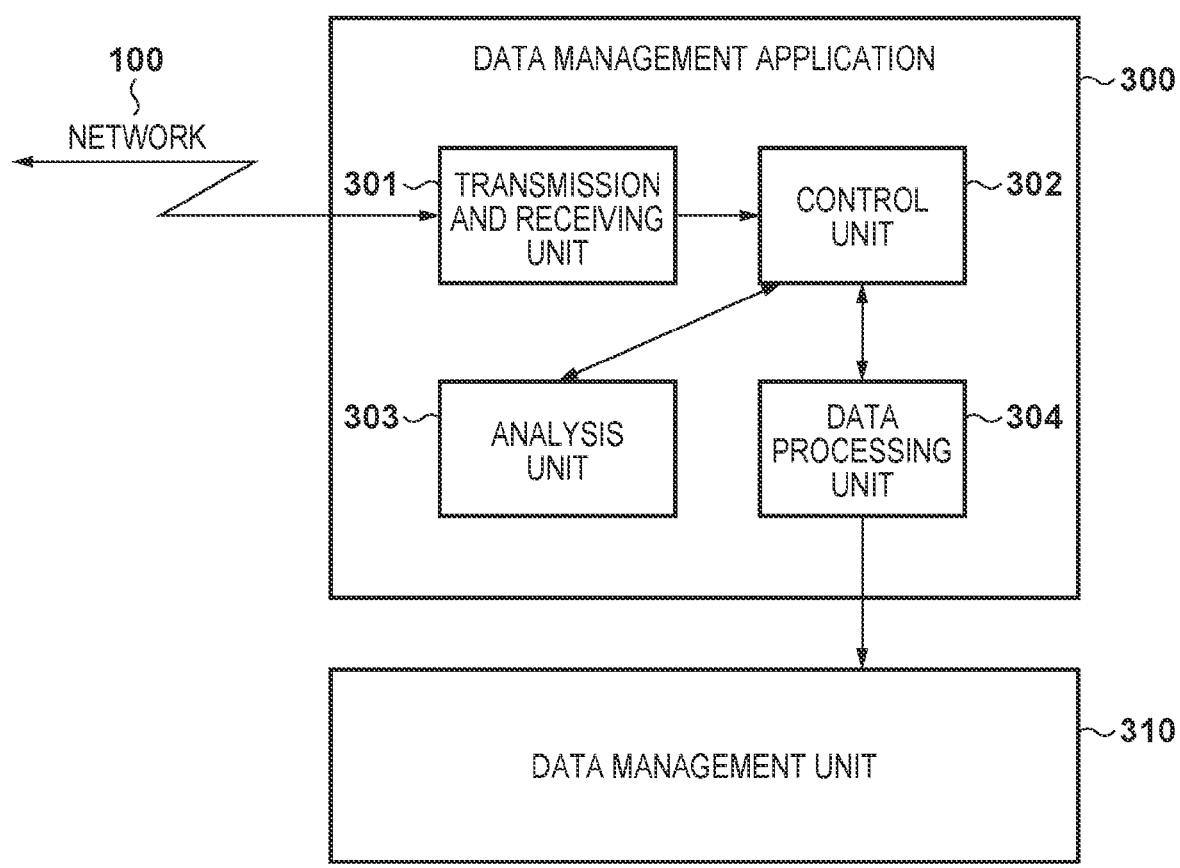
FIG. 3 is a diagram illustrating a block configuration of a data management application.

FIG. 3 is a diagram illustrating a block configuration of a data management application program (hereinafter, referred to simply as "data management application") for realizing the server function of the server 120 operating on the digital multifunction peripheral 110a. The data management application 300 is stored in a storage unit of the RAM 203, the HDD 205, or the ROM 206, and is read and executed by the CPU 202.

The data management application 300 includes a transmission and receiving unit 301, a control unit 302, an analysis unit 303, and a data processing unit 304. The transmission and receiving unit 301 receives a processing request from a digital multifunction peripheral 110 via the network I/F 207, and transmits a result as a response to the processing request. The control unit 302 performs overall control of the blocks of the data management application 300. The analysis unit 303 analyzes the processing request received by the transmission and receiving unit 301. The data processing unit 304 communicates with a data management unit 310 in response to the processing request received by the transmission and receiving unit 301, and executes generation, updating, deletion, or reference of data. Information and data that are managed by the data management unit 310 are stored in a storage region such as the HDD 205 or the RAM 203. The information and data that are managed by the data management unit 310 include various types of setting data (described later), corresponding management information, the number of digital multifunction peripherals registered in the server 120, history of change in the number of registered digital multifunction peripherals, the past maximum number of registered digital multifunction peripherals, and the like.

The data management application 300 manages setting data of the digital multifunction peripheral 110. The setting data of the digital multifunction peripheral 110 includes, for example, "personalized data", "device basic data", "device specification data" and "device setting data". Furthermore, the setting data of the digital multifunction peripheral 110 includes, for example, "one-touch address book data", "general address book data", "administrator address book data", and "user information data". "Personalized data" is user data, in which, for example, a user of the digital multifunction peripheral 110 registers a display language, a shortcut button, and the like as user data. "Device basic data" is data relating to device information such as a device identification number or the version of the digital multifunction peripheral 110. "Device specification data" is data relating to an operation specification of the device such as information indicating whether or not the digital multifunction peripheral 110 supports various types of setting data, and information indicating a region supported by the digital multifunction peripheral 110. "Device setting data" is data relating to device setting of the digital multifunction peripheral 110 such as network settings and printer operation settings. "One-touch address book data" is address data of a one-touch address book that is used in the digital multifunction peripheral 110. "General address book data" is address data in an address book that is used by a general user, in the digital multifunction peripheral 110. "Administrator address book data" is address data of an administrator-dedicated address book that is used by an administrator of the digital multifunction peripheral 110. "User information data" is data indicating information on users who can use the digital multifunction peripheral 110.

The data management application 300 manages, for each type of setting data, the volume of data currently managed by the data management unit 310. Furthermore, the data management application 300 manages the upper limit of the volume of data that can be managed by the data management unit 310, the lower limit of the volume of data that should be managed by the data management unit 310, and a shared range of the setting data, as management information.

FIGS. 4 and 5 are diagrams illustrating examples of tables for the data management application 300 to manage the above-described information for each type of setting data. As shown in FIG. 4, the data management application 300 manages the information of the types of setting data in a table format. "Current data volume" of FIG. 4 indicates the volume of data currently managed by the data management unit 310. "Upper limit" of FIG. 4 indicates a limit value of the data volume, and particularly indicates the upper limit of the volume of data that can be managed by the data management unit 310. "Lower limit" of FIG. 4 is a limit value of the data volume, and particularly indicates the lower limit of the volume of data that should be managed by the data management unit 310. "Shared/individual" of FIG. 4 indicates the shared range of the setting data, namely, "shared" indicates that the corresponding type of data is shared with another device and "individual" indicates that the corresponding type of data is not shared with another device and is unique to the device.

Furthermore, the data management application 300 manages, as management information for each type of setting data, the minimum value of the minimum required data volume for management of one digital multifunction peripheral 110 and the maximum value of the data volume that can be stored by the digital multifunction peripheral 110. FIG. 5 is a diagram illustrating an example of the table for the data management application 300 to manage the above-described information for each type of setting data. As shown in FIG. 5, the data management application 300 manages the information of the types of setting data in a table format. "Minimum value" of FIG. 5 indicates the minimum value of the minimum required data volume for management of one digital multifunction peripheral 110. "Maximum value" of FIG. 5 indicates the maximum value of the data volume that can be stored by the digital multifunction peripheral 110. "–" of FIG. 5 indicates that no fixed value has been set.

The tables shown in FIGS. 4 and 5 are stored in, for example, the HDD 205 or the RAM 203. Furthermore, the storage format is not limited to the table format as shown in FIGS. 4 and 5, and the storage may be performed in another mode as long as the types of setting data are associated with the information. The same applies to FIGS. 6, 8, 10 to 14, 16, and 19, which will be described later.

"One-touch address book data", "general address book data", "administrator address book data", and "user information data" of FIGS. 4 and 5 can selectively be set to "shared" or "individual". The data set to "shared" indicates that it is setting data shared by a plurality of digital multifunction peripherals 110. The data set to "individual" indicates that it is setting data individual to each digital multifunction peripheral 110 (setting data unique to the digital multifunction peripheral 110). Based on this selected state, the data processing unit 304 determines whether to request the data management unit 310 to hold the data for each digital multifunction peripheral 110 individually, or to share the same data with a plurality of digital multifunction peripherals 110. If, for example, "one-touch address book data" is set to "shared", the same data will be accessed even if a plurality of digital multifunction peripherals 110 are registered, and thus the volume of data for only one digital multifunction peripheral will be secured. On the other hand, if "one-touch address book data" is set to "individual", a volume of data that corresponds to the number of the registered digital multifunction peripherals 110 is secured.

Determination of Lower Limit in Initial State

FIG. 6 is a diagram illustrating an example of the table that indicates a data volume management state for each type of setting data, in an initial state in which no digital multifunction peripheral 110 is registered in the server 120. The present embodiment describes, as an example, a case where up to ten digital multifunction peripherals 110 to be managed can be registered, and the maximum value of the volume of data that can be managed is 2048 MB. The items of FIG. 6 other than "shared/individual" indicate the data volume management state after the processing of FIG. 7 is executed.

Figure 7:
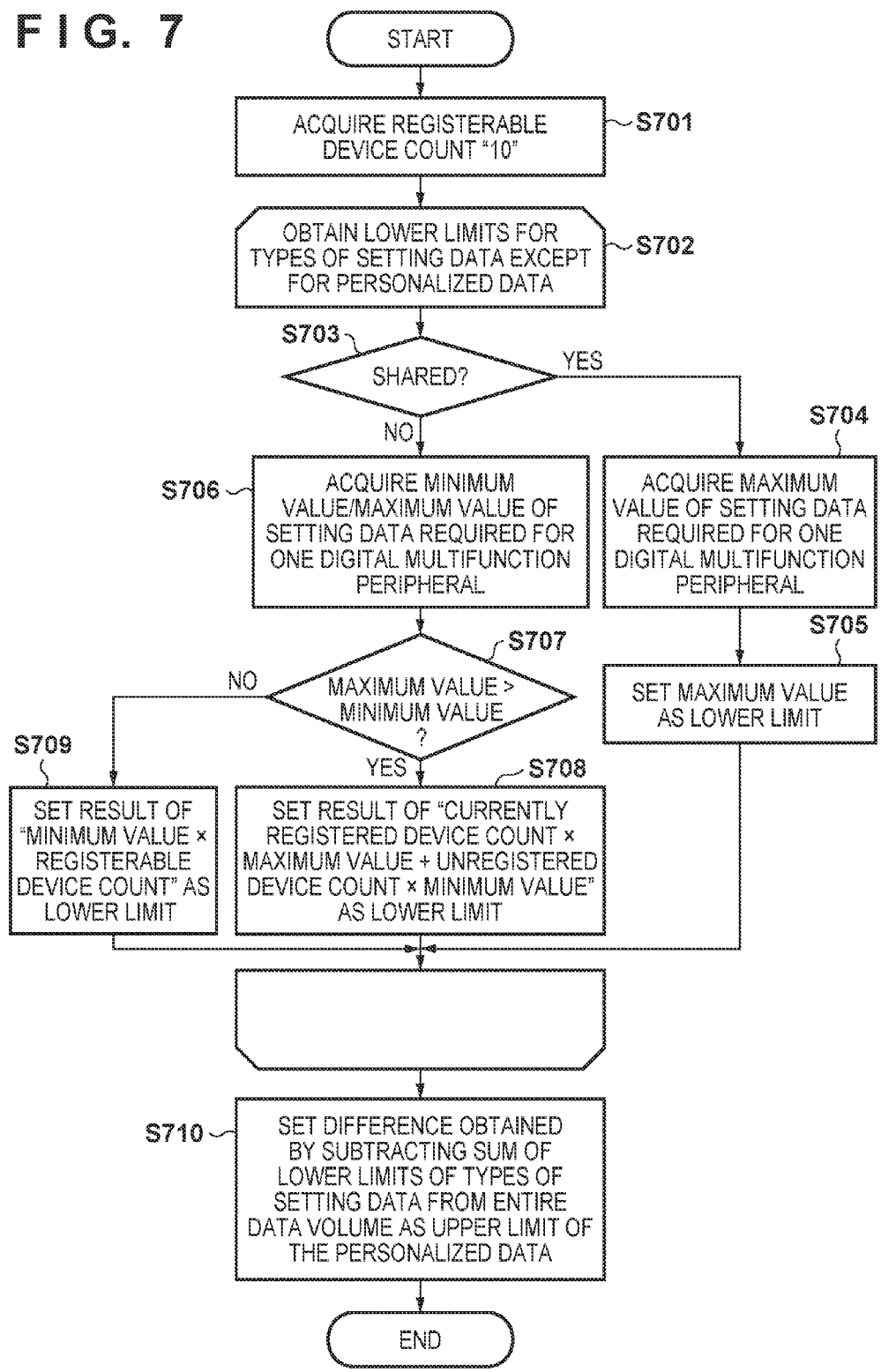
FIG. 7 is a flowchart of processing for updating the data volume of the setting data.

FIG. 7 is a flowchart of processing in which the data management application 300 determines the data volume for each type of setting data. In step S701, the control unit 302 of the data management application 300 acquires the number of devices that can be registered in the server 120 (registerable device count). Here, the control unit 302 acquires "10". In processing from steps S702 onward, processing is executed for obtaining the lower limits of the types of setting data except for the personalized data.

In step S703, the control unit 302 focuses on a specific type of setting data, and determines whether or not the specific type of setting data has been set to be shared by a plurality of digital multifunction peripherals 110. If it is determined that the specific type of setting data has been set to be shared, the procedure moves to step S704, whereas if it is determined that the specific type of setting data has not been set to be shared, that is, the data has been set to be individual, the procedure moves to step S706. For example, in the case of the one-touch address book, the setting is "shared" as shown in FIG. 6, and thus the procedure moves to S704.

In step S704, the control unit 302 acquires the maximum value of the setting data with reference to the table of FIG. 5. For example, in the case of the one-touch address book, the control unit 302 acquires "20 MB" from the table of FIG. 5. In step S705, the control unit 302 sets the maximum value acquired in step S704 as the lower limit. For example, in the case of the one-touch address book, the lower limit is set to "20 MB" as shown in FIG. 6.

As described above, in the present embodiment, if the setting data is shared with another device, the maximum volume of the data that can be held by the digital multifunction peripheral 110 is set as the lower limit of the volume of the data that should be stored by the data management unit 310. As a result, the volume of the setting data that can be managed is ensured.

If it is determined in step S703 that the setting data is not set to "shared", the procedure moves to step S706. The control unit 302 acquires, in step S706, the maximum value and the minimum value of the setting data with reference to the table of FIG. 5, and determines, in step S707, whether or not the maximum value is larger than the minimum value. Here, if it is determined that the maximum value is larger than the minimum value, the procedure moves to step S708, whereas if it is determined that the maximum value is not larger than the minimum value, the procedure moves to step S709. The case where the maximum value is not larger than the minimum value refers to, for example, the case of device basic data in which no maximum value is determined as shown in FIG. 5, and the control unit 302 cannot acquire the maximum value. Accordingly, in this case, it is determined in step S707 that the maximum value is not larger than the minimum value and the procedure moves to step S709. In step S709, the control unit 302 multiplies the minimum value acquired in step S706 by the registerable device count acquired in step S701, and sets the obtained product as the lower limit. For example, in the case of the device basic data, the product "10 MB" obtained by multiplying the minimum value "1 MB" by the registerable device count "10" is set as the lower limit as shown in FIG. 6.

Furthermore, in the case of the device setting data for example, "5 MB" is acquired as the maximum value and "2 MB" is acquired as the minimum value as shown in FIG. 5. Then, it is determined in step S707 that the maximum value is larger than the minimum value, and the procedure moves to step S708. In step S708, the control unit 302 calculates the formula "the number of currently registered devices (currently registered device count)×the maximum value+the number of unregistered devices (unregistered device count)×the minimum value". In this example, the currently registered device count is zero, and thus "20 MB" is calculated based on "the unregistered device count 10×2 MB", and is set as the lower limit of the device setting data as shown in FIG. 6.

Accordingly, with respect to the types of setting data that are not set to "shared", a volume of data that is obtained by multiplying the minimum required data volume for managing one digital multifunction peripheral by the number of registered devices is set as the lower limit of the volume of data that should be managed by the data management unit 310. As a result, it is possible to prevent the data volume for unregistered digital multifunction peripherals from being unnecessarily secured.

The above-described processing from steps S702 onward is performed for each type of setting data, and the lower limit for each type of setting data is set as shown in FIG. 6. In step S710, the control unit 302 subtracts the sum of the lower limits of the respective types of setting data obtained in previous steps from the entire volume of data, and sets the value of the obtained result as the upper limit of the personalized data. For example, in the case of FIG. 6, the sum of the lower limits is "340 MB", and thus the value "1708 MB" that is obtained by subtracting the sum "340 MB" from the entire volume of data "2048 MB" is set as the upper limit of the personalized data. After step S710, the processing of FIG. 7 ends.

Registration of Two Devices in Initial State

The following will describe processing for obtaining a data volume for each type of setting data when two digital multifunction peripherals 110 are registered in the initial state with reference to the flowchart of FIG. 7. Differences from the above description of FIG. 7 will be described taking the device setting data as an example. In the case of the device setting data, the control unit 302 determines in step S703 that the data has not been set to "shared", and acquires in step S706 the maximum value "5 MB" and the minimum value "2 MB". In step S707, it is determined that the maximum value "5 MB" is larger than the minimum value "2 MB", and the procedure moves to step S708.

In step S708, the control unit 302 obtains a sum of the product obtained by multiplying the maximum value "5 MB" by the currently registered device count "2" and the product obtained by multiplying the minimum value "2 MB" by the unregistered device count "8", and sets the obtained sum as the lower limit. In other words, in this example, "26 MB" is set as the lower limit of the device setting data as shown in FIG. 8. Furthermore, the upper limit of the personalized data is set to "1702 MB" that is obtained by subtracting the sum of the lower limits "346 MB" from the entire data volume "2048 MB".

By setting the lower limits in the above-described manner, the maximum value is taken into consideration even when device setting data is added to the already registered digital multifunction peripheral, and thus the volume of data that the data management application 300 can manage is ensured. Furthermore, unnecessarily securing of the volume of device setting data of unregistered digital multifunction peripherals 110 of which registration thereof is unclear is avoided, and only the minimum required volume of data for registration is secured. As a result, it is possible to reduce the probability of an error occurring when a digital multifunction peripheral 110 is actually added and registered.

Setting Change of Shared Data to Individual

Figure 9:
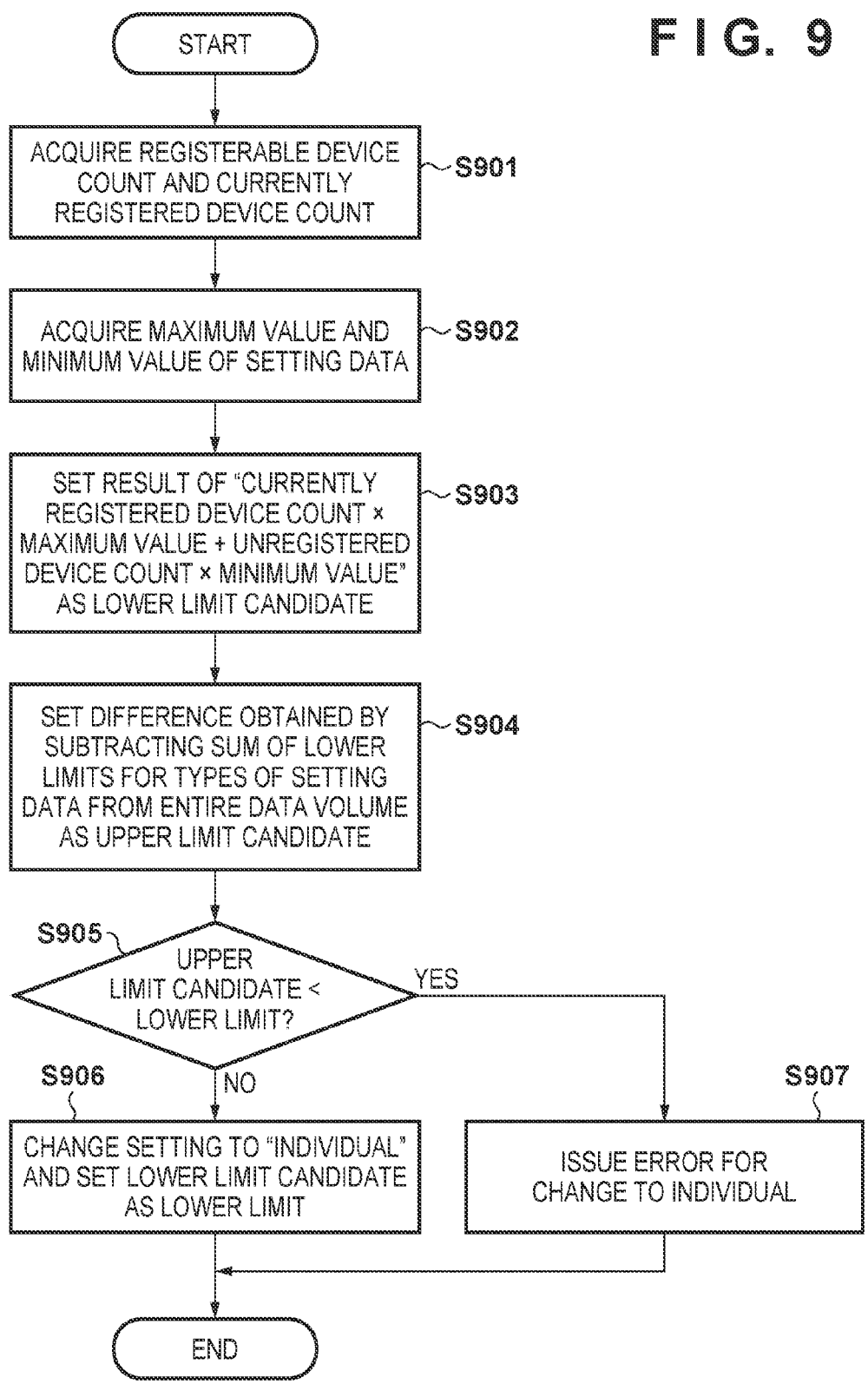
FIG. 9 is a flowchart of processing for determining whether or not the setting data is to be changed between "individual" and "shared".

The following will describe processing that is performed by the data management application 300 when the setting of the one-touch address book data is changed from "shared" to "individual" while the above-described two digital multifunction peripherals are registered and operating, with reference to the flowchart of FIG. 9. It is assumed that the data volume for each type of setting data before execution of the processing is as shown in FIG. 10. In this example, the data volume "50 MB" of the personalized data that is managed at this point in time is set as the lower limit of the volume of data that should be managed by the data management unit 310.

In step S901, the control unit 302 of the data management application 300 makes an inquiry to the data processing unit 304 as to the number of currently registered devices. The data processing unit 304 acquires the number of registered digital multifunction peripherals 110 from the data management unit 310, and transmits the registered digital multifunction peripheral count "2" back to the control unit 302, for example. Furthermore, the control unit 302 acquires the registerable digital multifunction peripheral count "10".

In step S902, the control unit 302 acquires the maximum value "20 MB" and the minimum value "10 MB" of the one-touch address book data whose setting is to be changed to "individual" with reference to the table of FIG. 5. In step S903, the control unit 302 obtains a lower limit candidate for the one-touch address book using the values acquired in steps S901 and S902. In this example, the control unit 302 obtains, as the lower limit candidate, "120 MB" based on the formula "the currently registered device count 2×the maximum value 20 MB+the unregistered device count 8×the minimum value 10 MB".

In step S904, the control unit 302 obtains the sum of the lower limits of the types of data except for the personalized data using the lower limit candidate obtained in step S903, and sets, as an upper limit candidate of the personalized data, the difference obtained by subtracting the sum from the entire volume of data that can be managed. In other words, in this example, the lower limit of the one-touch address book is changed from "20 MB" to "120 MB", and thus the upper limit candidate of the personalized data is changed to "1602 MB".

In step S905, the control unit 302 determines whether or not the upper limit candidate obtained in step S904 is smaller than the lower limit of the personalized data. In this example, since the upper limit candidate 1602 MB is larger than the lower limit 50 MB, it is determined that the upper limit candidate obtained in step S904 is not smaller than the lower limit of the personalized data, and the procedure moves to step S906.

In step S906, the control unit 302 determines that the setting of the one-touch address book can be changed to "individual", and requests the data processing unit 304 to change the setting so that the one-touch address book data is subjected to individual management. The data processing unit 304 makes a request to replication of the one-touch address book data managed by the data management unit 310 as many fold as the number of digital multifunction peripherals. The data management unit 310 replicates the managed one-touch address book data as many fold as the number of registered devices (for example, two-fold). After receiving a processing completion notification from the data processing unit 304, the control unit 302 sets the one-touch address book to "individual", and changes the "lower limit" to "120 MB" that is the lower limit candidate obtained in step S903. After step S906, the processing of FIG. 9 ends.

FIG. 11 is a diagram showing the state after the processing of FIG. 9 is performed in the state shown in FIG. 10. As shown in FIG. 11, the lower limit of the volume of the one-touch address book data that should be managed by the data management unit 310 is changed to 120 MB, and the setting of "shared/individual" is changed to "individual". Furthermore, the upper limit of the data volume of the personalized data that can be managed by the data management unit 310 is changed to 1602 MB.

Accordingly, in the present embodiment, when the lower limit of the setting data is increased by changing the setting data set to "shared" to "individual", it is determined whether or not the upper limit of the personalized data satisfies a predetermined condition. For example, as in step S905, it is determined whether or not the upper limit of the personalized data is lower than a predetermined threshold like the lower limit. That is, the setting of setting data is changed from "shared" to "individual" after checking as to whether or not the minimum data volume of the personalized data has been secured even when the lower limit of the setting data is increased. Processing that is performed when, in step S905, the upper limit candidate is smaller than the lower limit of the personalized data will be described later.

Registration of Third Device

The following will describe, with reference to the flowchart of FIG. 7, processing for updating the data volume for each type of setting data to be managed by the control unit 302 when the setting of the one-touch address book is changed to "individual" and then a third digital multifunction peripheral is registered. The processing is different from the above description of FIG. 7 in that in step S703 of the processing for obtaining the lower limit of the one-touch address book, the determination is "No".

In the processing for obtaining the lower limit of the one-touch address book of FIG. 7, it is determined in step S703 that the setting is not "shared" and the procedure moves to step S706, and in step S706, the control unit 302 acquires the minimum value "10 MB" and the maximum value "20 MB". Then, in step S707, it is determined that the maximum value is larger than the minimum value, and the procedure moves to step S708.

In step S708, the control unit 302 obtains, as a new lower limit, the sum "130 MB" of the product obtained by multiplying the maximum value "20 MB" by the registered device count "3" and the product obtained by multiplying the minimum value "10 MB" by the unregistered device count "7". In step S710, the upper limit of the personalized data is set to 1589 MB, and then the processing of FIG. 7 ends. The data volume for each type of setting data after the processing of FIG. 7 is updated as shown in FIG. 12. Note that in FIG. 12, the lower limit of the device setting data is set to "29 MB". This is because, with respect to the device setting data, "29 MB" is obtained in step S708 based on the formula "the device count 3×5 MB+device count 7×2 MB".

By obtaining the lower limit of the one-touch address book data as described above, the maximum value is taken into consideration even when one-touch address book data is added to a digital multifunction peripheral, the volume of data that the data management application 300 can manage is ensured.

Warning Processing in Step S907 of FIG. 9

The following will describe processing that is performed when the setting of the general address book data is changed to "individual" and when the setting of an administrator address book is changed to "individual" in a state in which the personalized data is managed to some extent with reference to the flowchart of FIG. 9. Here, it is assumed that the current data volume of the personalized data is "750 MB" when a request for a change to "individual" is accepted by the data management application 300. Upon accepting the request to change the setting of the general address book data to "individual", the control unit 302 acquires, in step S901, the currently registered device count and the registerable device count. Here, the control unit 302 acquires the currently registered device count "3" and the registerable device count "10".

In step S902, the control unit 302 acquires the maximum value "160 MB" and the minimum value "80 MB" of the general address book with reference to the table of FIG. 5. In step S903, the control unit 302 obtains the lower limit candidate "1040 MB" based on the sum of the product obtained by multiplying the maximum value "160 MB" by the registered device count "3" and the product of the minimum value "80 MB" by the unregistered device count "7". In step S904, the control unit 302 obtains the upper limit candidate "709 MB" of the personalized data by subtracting the sum of the lower limits from the entire volume "2048 MB" of data that can be managed. FIG. 13 shows a diagram showing the state of the present example in which the upper limit candidate for the personalized data is obtained.

In step S905, the control unit 302 determines that the upper limit candidate "709 MB" is smaller than the current lower limit "750 MB" of the personalized data. In step S907, the control unit 302 determines that the setting of the general address book data cannot be changed to "individual", and performs error notification processing for notifying a user of the fact that the setting cannot be changed. In the error notification processing, the control unit 302 causes the operation unit 220 to display a warning message indicating that the setting of the general address book data cannot be changed to "individual". Then, the control unit 302 restricts the setting operation for changing the setting of the general address book to "individual", and ends the processing of FIG. 9.

Upon accepting a request to change the setting of the administrator address book data to "individual", the control unit 302 acquires, in step S902, the maximum value "20 MB" and the minimum value "10 MB" of the administrator address book. The control unit 302 obtains the lower limit candidate "130 MB" in step S903, and obtains the upper limit candidate "1479 MB" of the personalized data in step S904. In step S905, it is determined that the upper limit candidate "1479 MB" is larger than the lower limit "750 MB", and the procedure moves to step S906. In step S906, the control unit 302 requests the data processing unit 304 to change the setting of the administrator address book data to "individual". After execution of the change to "individual", the data volume for each type of setting data is updated as shown in FIG. 14.

As described above, control is performed such that the management state is not changed when it is presumed that setting data cannot be managed during the subsequent operation. In other words, when it is presumed that the minimum volume of the personalized data cannot be secured during subsequent operation, the setting of the setting data is not changed to "individual". As a result, it is possible to prevent an error from occurring during operation.

In the present embodiment, a description has been given taking an example in which the management state of the setting data is changed from "shared" to "individual", but the same processing may be executed when, for example, the volume of the setting data that is managed by the data management application 300 is increased. As a result, it is possible to determine in advance whether or not a certain type of setting data cannot be managed and an error will occur during operation once the volume of the setting data is increased, thus making it possible to prevent the error from occurring.

Second Embodiment

The present embodiment describes a case in which the lower limit of the personalized data is controlled. In the first embodiment, the upper limit of the personalized data is controlled based on the number of registered digital multifunction peripherals 110 and the management state of setting data. As a result, it is possible to prevent a failure to change the settings of the digital multifunction peripheral 110 due to too much personalized data being registered. In the present embodiment, a configuration for preventing a failure in which an actual user no longer performs registration due to the upper limit of the personalized data being excessively lowered will further be described.

Hereinafter, differences from the first embodiment regarding the processing of FIG. 7 in which the data management application 300 obtains the data volume for each type of setting data will be described. In the present embodiment, after step S710 of FIG. 7, processing of FIG. 15 is executed.

Figure 15:
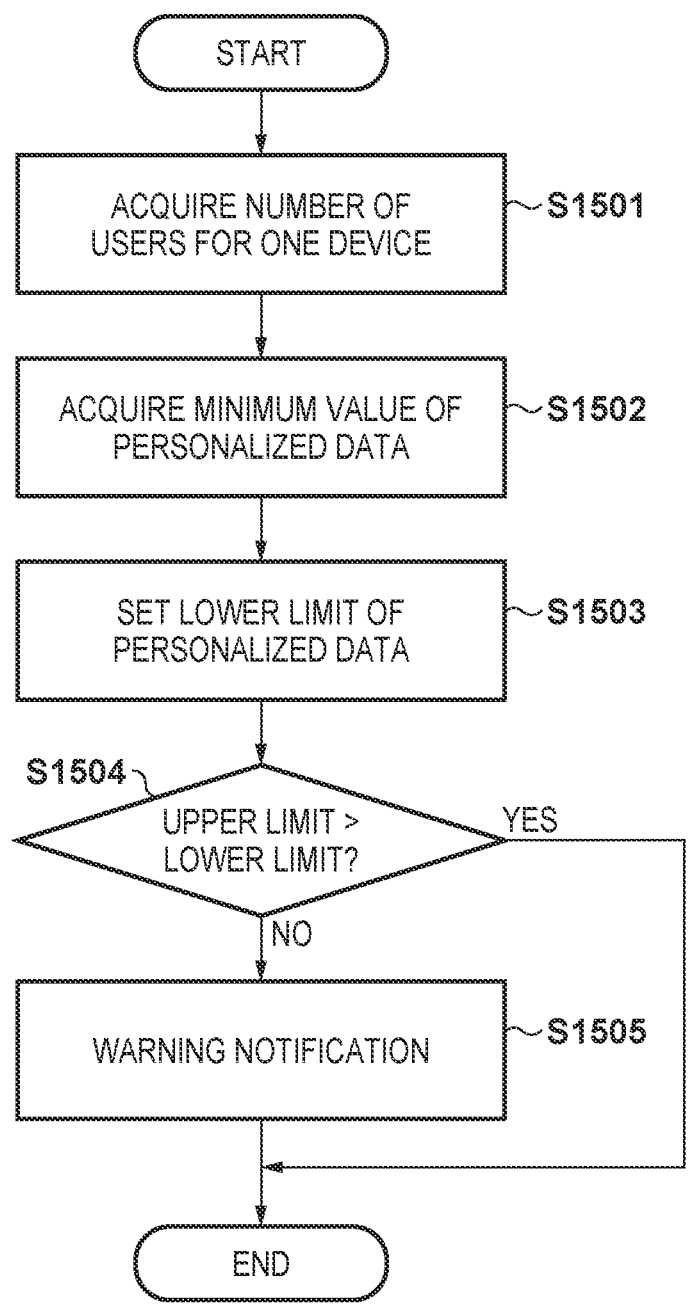
FIG. 15 is a flowchart of processing for updating the lower limit of personalized data.

The control unit 302 of the data management application 300 sets the upper limit of the personalized data in step S710, and then executes step S1501 of FIG. 15. In step S1501, the control unit 302 acquires an estimation value of the number of users who use one digital multifunction peripheral 110. This value may be statically held by the control unit 302 or may be obtained based on the actual usage state. In this example, for example, the control unit 302 is assumed to acquire "100" as the number of users who use one digital multifunction peripheral.

Then, in step S1502, the control unit 302 acquires the minimum value "0.5 MB" of the personalized data with reference to the table of FIG. 5. In step S1503, the control unit 302 obtains the lower limit "50 MB" of the personalized data of each digital multifunction peripheral based on the product of the values obtained in steps S1501 and S1502. Then, the control unit 302 obtains the lower limit "100 MB" of the personalized data based on the device count "2", which is the number of currently registered digital multifunction peripherals 110.

In step S1504, the control unit 302 compares the lower limit "100 MB" obtained in step S1503 with the upper limit obtained in step S710, and determines whether or not the upper limit is larger than the lower limit. Here, if it is determined that the upper limit is larger than the lower limit, processing of FIG. 15 ends. On the other hand, if it is determined that the upper limit is not larger than the lower limit, the control unit 302 executes, in step S1505, the error notification processing for performing notification with a warning message indicating that registration of personalized data may be impossible, and then the processing of FIG. 15 ends. In the example of FIG. 8 of the first embodiment in which two digital multifunction peripherals are registered, it is determined in step S1504 that the upper limit is larger, and as shown in FIG. 16, the lower limit of the personalized data is set to "100 MB".

As described above, when a digital multifunction peripheral 110 is added to the system 10 and it is expected that the number of users who are to use the digital multifunction peripherals 110 will increase in the future, the lower limit is increased in advance even when no user actually uses the digital multifunction peripheral 110 to register personalized data. As a result, it is possible to secure the volume of the personalized data that can be managed. Furthermore, if it is estimated that the lower limit exceeds the upper limit, a user will be warned of the fact, and thus it is possible to prevent an error from occurring due to the user actually configuring the settings of the personalized data.

Third Embodiment

The present embodiment describes a case in which system operation whereby the data management application 300 manages the setting data of the digital multifunction peripheral 110 is temporarily stopped, and then the management of the setting data by the data management application 300 is again started.

Figure 17:
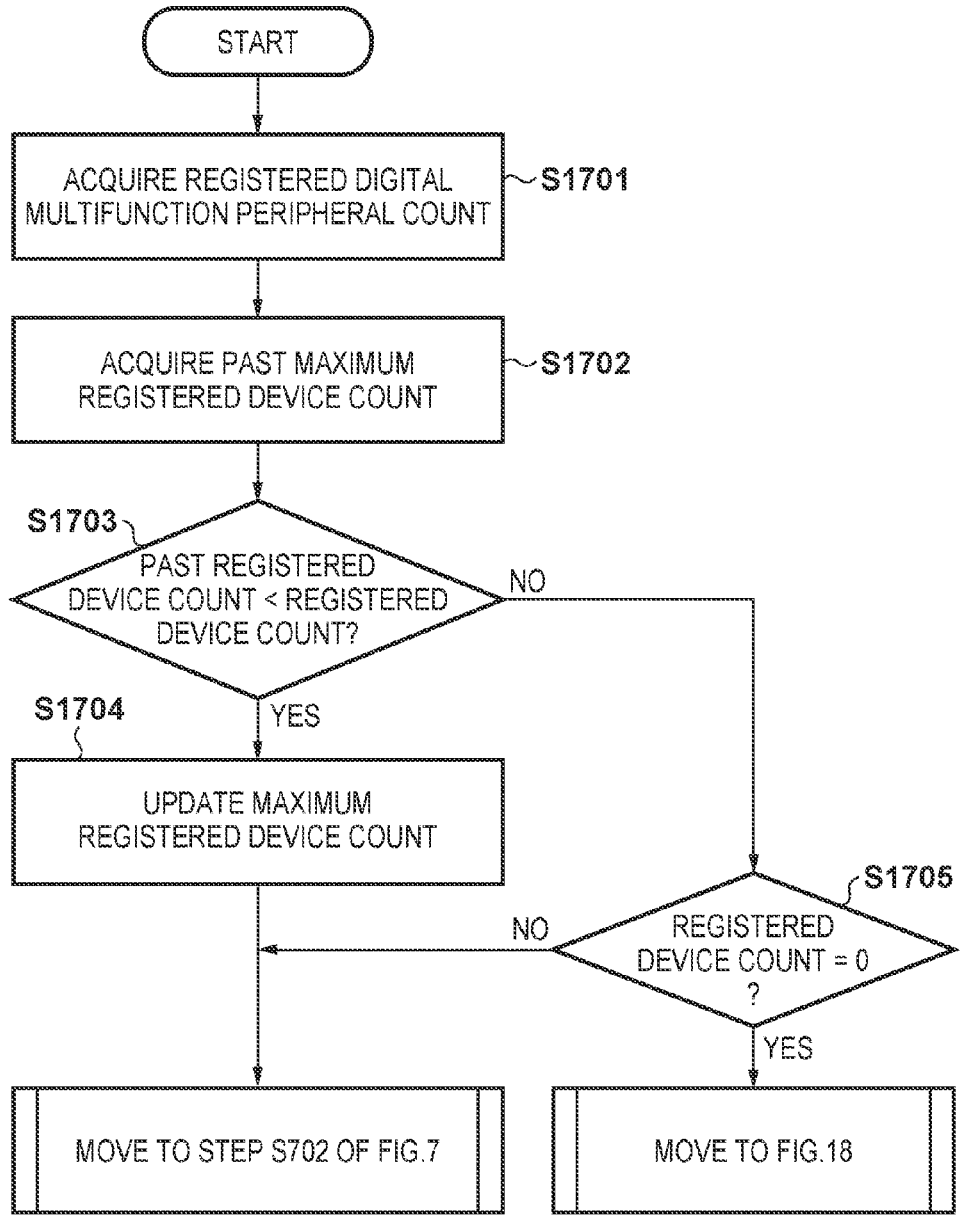
FIG. 17 is a flowchart of processing for updating the maximum registered device count.

The present embodiment is different from the first embodiment in that processing for updating the maximum number of the registered digital multifunction peripherals 110 is performed in the processing of FIG. 7 for obtaining the data volume for each type of setting data. After a registerable device count is acquired in step S701 of FIG. 7, the control unit 302 executes the processing shown in FIG. 17.

In step S1701, the control unit 302 makes an inquiry to the data processing unit 304 as to the number of currently registered devices, and acquires the number of the registered digital multifunction peripherals 110. In step S1702, the control unit 302 makes an inquiry to the data processing unit 304 as to the maximum number of digital multifunction peripherals 110 registered in the past (past maximum registered device count). The data processing unit 304 acquires information on the past maximum registered device count that is registered in the data management unit 310, and transmits the acquired information back to the control unit 302.

In step S1703, the control unit 302 determines whether or not the registered device count acquired in step S1701 is larger than the past maximum registered device count acquired in step S1702. Here, if it is determined that the currently registered device count is larger than the past maximum registered device count, the procedure moves to step S1704.

In step S1704, the control unit 302 requests the data processing unit 304 to update the maximum registered device count to the currently registered device count. The data processing unit 304 requests the management unit 310 to update the information on the past maximum registered device count, and transmits the result back to the control unit 302. After the processing of S1704, the processing of FIG. 17 ends, and the processing returns to step S702 of FIG. 7.

Figure 18A:
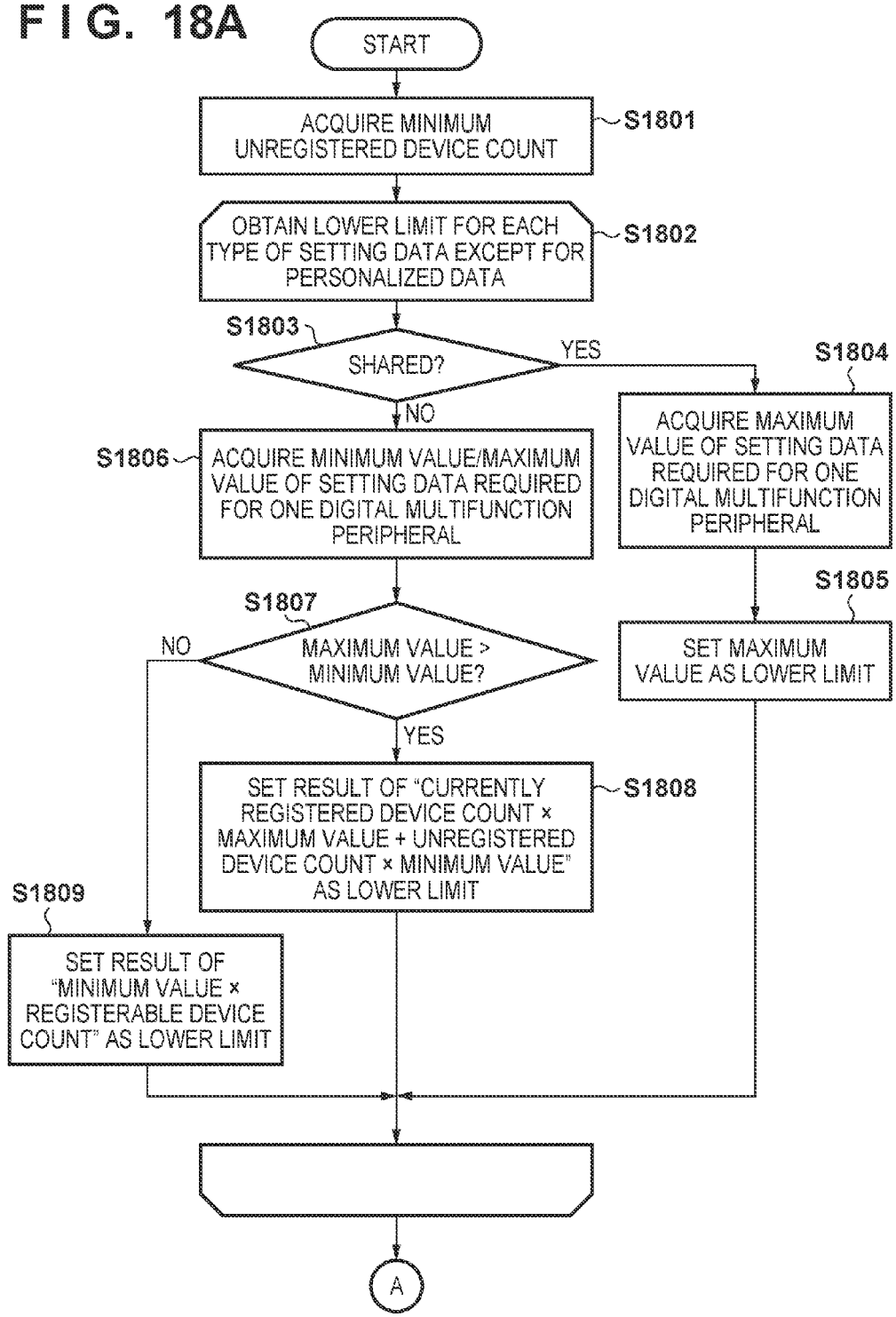

On the other hand, if it is determined in step S1703 that the past maximum registered device count is larger, the procedure moves to step S1705. In step S1705, the control unit 302 determines whether or not the number of registered digital multifunction peripherals 110 acquired in step S1701 is zero. If it is determined that the number of devices is not zero, the procedure of FIG. 17 ends, and returns to step S702 of FIG. 7. If it is determined in step S1705 that the number of devices is zero, the control unit 302 executes the processing of FIGS. 18A and 18B.

In step S1801, the control unit 302 subtracts the past maximum registered device count from the registerable device count, and acquires the minimum unregistered device count. For example, if the past maximum registered device count is "3", the control unit 302 subtracts the maximum registered device count "3" from the registerable device count "10" to obtain the minimum unregistered device count "7". In the processing from steps S1802 onward, similar to step S702 of FIG. 7, the lower limits of the types of setting data except for the personalized data are obtained.

Steps S1803 to S1807, and S1809 are the same as the steps S703 to S707, and S709. In step S1808, the control unit 302 obtains a sum of the product obtained by multiplying the maximum value by the past maximum registered device count "3" obtained in step S1702 and the product obtained by multiplying the minimum value by the minimum unregistered device count obtained in step S1801, and sets the obtained sum as the lower limit.

In step S1810, similar to step S1501, the control unit 302 acquires the NUMBER OF USERS FOR ONE device, and in step S1811, the control unit 302 acquires the minimum value of the personalized data.

In step S1812, the control unit 302 obtains the lower limit "50 MB" of the personalized data for one digital multifunction peripheral based on the product of the values specified in steps S1810 and S1811. Then, the control unit 302 obtains the lower limit "150 MB" of the personalized data based on the past maximum registered device count "3".

In step S1813, the control unit 302 determines whether or not the sum of the lower limits of all of the types of setting data is larger than the entire volume of data that can be managed. Here, if it is determined that the sum of the lower limits is larger than the entire volume of data that can be managed, the control unit 302 executes, in step S1814, the error notification processing for performing notification with a warning message, and then ends the processing of FIGS. 18A and 18B. On the other hand, if it is determined in step S1813 that the sum of the lower limits is not lager than the volume of data that can be managed, the procedure returns to step S702 of FIG. 7.

FIG. 19 is a diagram illustrating an example of the data volume of the types of setting data that are obtained such that system operation is temporarily stopped after the state of FIG. 12 in the first embodiment (three devices are connected and the setting of the one-touch address book is set to "individual"), the setting of the general address book is changed to "individual", and then system operation is started again. As shown in FIG. 19, the one-touch address book and the general address book are set to "individual". Accordingly, in step S1808, the sum of the product obtained by multiplying the maximum value by the past maximum registered device count "3" obtained in step S1702 and the product obtained by multiplying the minimum value by the minimum unregistered device count "7" obtained in step S1801 is set as the lower limit. "130 MB" is set as the lower limit of the one-touch address book since it has the maximum value "20 MB" and the minimum value "10 MB". Furthermore, "1040 MB" is set as the lower limit of the general address book since it has the maximum value "160 MB" and the minimum value "80 MB". The value "150 MB" obtained in step S1811 is set as the minimum value of the personalized data. The difference "709 MB" obtained by subtracting the sum of the lower limits of the device basic data to the user information data from "2048 MB" is set as the maximum value for the personalized data. Furthermore, the sum of the lower limits of the personalized data to the user information data is 1489 MB, and thus in step S1813, it is determined that the sum of the lower limits is not larger than the entire volume of data that can be managed.

As described above, in a state in which new setting data is managed, such as when a function of the data management application 300 is added or when a digital multifunction peripheral 110 is replaced with a new device, it is possible to check in advance whether or not all of the digital multifunction peripherals 110 can be registered again. For example, in a case of an increase in setting data that is handled by the data management application 300, the sum of the lower limits may exceed the entire volume of data that can be managed. In such a case, by warning a user of the possibility that an error will occur during operation if the setting remains as is, it is possible to review the setting before starting the operation.

Other Embodiments

Embodiment(s) of the present invention can also be realized by a computer of a system or device that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or device by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-131843, filed Jun. 30, 2015, which is hereby incorporated by reference herein in its entirety.

What is claimed is:

1. A management apparatus for managing a device, the management apparatus comprising:
   a storage unit configured to store setting data for use in the device to be managed;
   an acquisition unit configured to acquire management information relating to the setting data, the management information being associated with each type of the setting data; and
   a control unit configured to control, for each type of the setting data, a limit value for a volume of the data to be stored in the storage unit based on the management information acquired by the acquisition unit.

2. The management apparatus according to claim 1, wherein the management information includes information indicating whether the setting data is setting data to be used only for the device or setting data to be shared by a plurality of devices.

3. The management apparatus according to claim 2, wherein in a case where the management information indicates that the setting data is setting data to be used only for the device, the control unit determines, based on a first volume that is defined for each type of the setting data, the limit value for the volume of the data to be stored in the storage unit.

4. The management apparatus according to claim 3, wherein the control unit determines, as the limit value for the volume of the data to be stored in the storage unit, a sum of (a) a product obtained by multiplying a second volume by the number of devices managed by the management apparatus, and (b) a product obtained by multiplying the first volume by the number of other devices that can be managed by the management apparatus, the second volume being larger than the first volume.

5. The management apparatus according to claim 4, wherein in a case where the management information indicates that the setting data is setting data to be shared by a plurality of devices, the control unit determines the limit value for the volume of the data to be stored in the storage unit based on the second volume.

6. The management apparatus according to claim 1, wherein the control unit determines (a) a first limit value for a first type of setting data in the storage unit based on the management information acquired by the acquisition unit, and (b) a second limit value for a second type of setting data in the storage unit based on the determined first limit value.

7. The management apparatus according to claim 6, wherein the first type of setting data is setting data associated with a device that is to be managed by the management apparatus,
   wherein the second type of setting data is data associated with a user of the device that is to be managed by the management apparatus, and
   wherein the control unit determines the second limit value by subtracting the first limit value from a volume of data that can be managed by the management apparatus.

8. The management apparatus according to claim 6, further comprising:
   a determination unit configured to determine whether or not the first limit value or the second limit value determined by the control unit meets a predetermined condition; and
   a notification unit configured to perform notification with a warning message in a case where it is determined by the determination unit that the first limit value or the second limit value meets the predetermined condition.

9. The management apparatus according to claim 8, wherein the predetermined condition is a condition in which the second limit value is smaller than a threshold when setting data to be shared by a plurality of devices is changed to setting data to be used only for the device.

10. The management apparatus according to claim 9, further comprising:
    a restricting unit configured to restrict the change of the setting data when the notification unit performs notification with the warning message.

11. A control method that is executed in a management apparatus provided with a storage unit configured to store setting data for use in a device to be managed, the control method comprising:
    acquiring management information relating to the setting data, the management information being associated with each type of the setting data; and
    controlling, for each type of the setting data, a limit value for a volume of the data to be stored in the storage unit based on the management information acquired in the acquiring.

12. A non-transitory computer-readable storage medium storing a program for causing a computer to execute:
    storing setting data for use in a device to be managed in a storage unit;
    acquiring management information relating to the setting data, the management information being associated with each type of the setting data; and
    controlling, for each type of the setting data, a limit value for a volume of the data to be stored in the storage unit based on the acquired management information.

13. A system including a device and a management apparatus configured to manage the device, the system comprising:
    a storage unit configured to store setting data for use in the device to be managed;
    an acquisition unit configured to acquire management information relating to the setting data, the management information being associated with each type of the setting data; and
    a control unit configured to control, for each type of the setting data, a limit value for a volume of the data to be stored in the storage unit based on the management information acquired by the acquisition unit.

* * * * *